May 31, 1966  S. HACKNEY  3,253,998
BOILING LIQUID NUCLEAR REACTOR
Filed Sept. 5, 1963  3 Sheets-Sheet 1
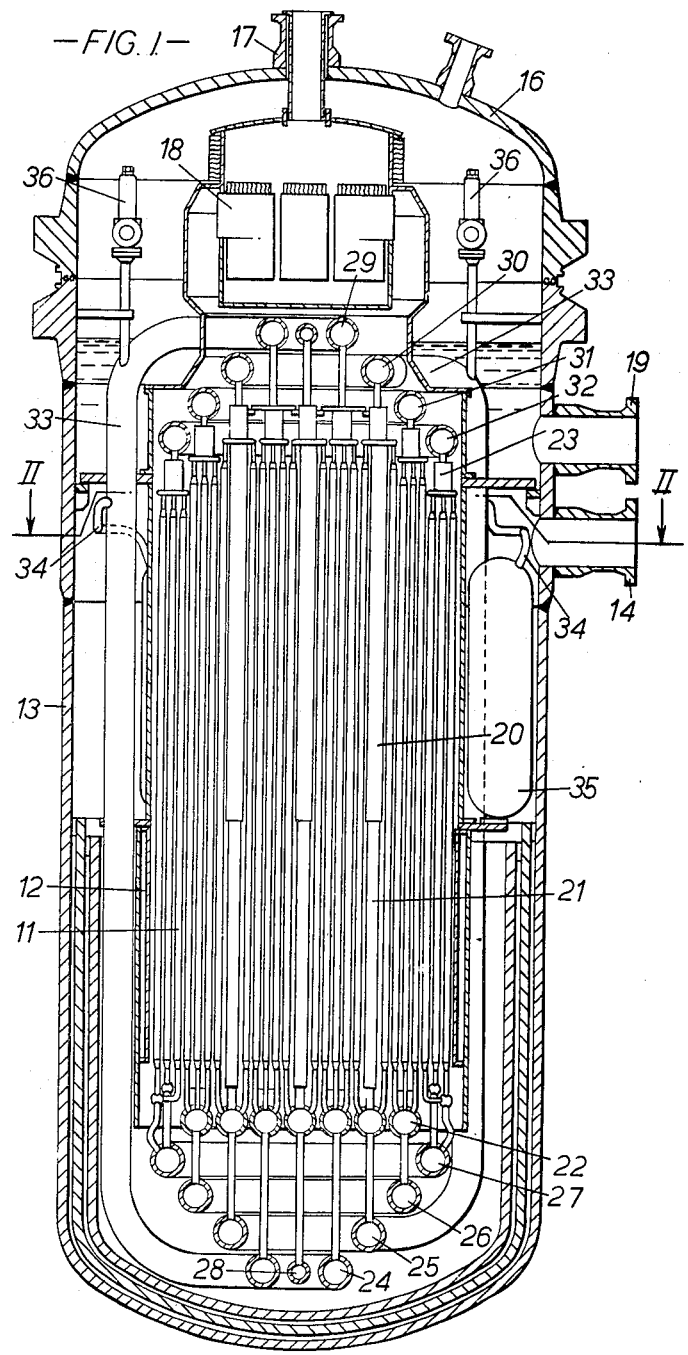

May 31, 1966  S. HACKNEY  3,253,998
BOILING LIQUID NUCLEAR REACTOR
Filed Sept. 5, 1963  3 Sheets-Sheet 2
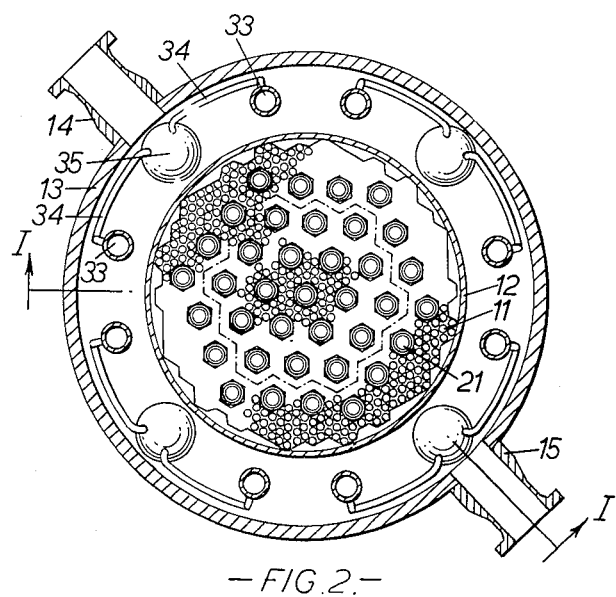
—FIG.2.—

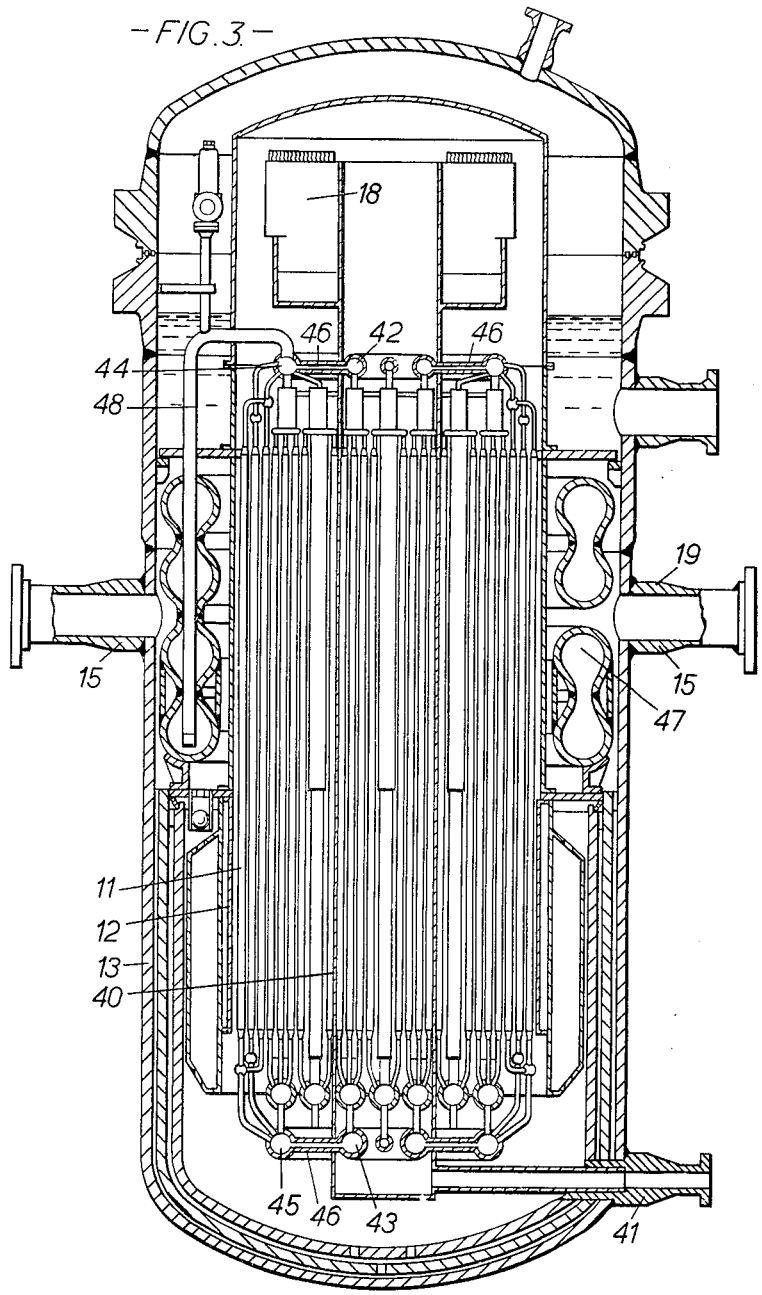

United States Patent Office 3,253,998
Patented May 31, 1966

3,253,998
BOILING LIQUID NUCLEAR REACTOR
Stanley Hackney, Fearnhead, near Warrington, England, assignor to United Kingdom Atomic Energy Authority, London, England
Filed Sept. 5, 1963, Ser. No. 306,743
Claims priority, application Great Britain, Sept. 19, 1962, 35,615/62
11 Claims. (Cl. 176—54)

This invention relates to nuclear reactors and particularly to nuclear reactors having a core of fuel elements which, together with a heat transfer fluid, are contained separately from a reactor coolant passed through the core. A reactor of this sort having the heat transfer fluid interposed as a layer between the fuel elements and reactor coolant is described and claimed in copending patent application Serial No. 113,734, filed May 31, 1961, now Patent No. 3,184,391.

According to one aspect of the present invention, a nuclear reactor having a core of fuel elements which, together with a heat transfer fluid, are contained separately from a reactor coolant passed through the core, is characterised in that a circuit for the heat transfer fluid has a riser section containing fuel elements and a downcomer section to return the fluid from the top to the bottom of the riser section, the downcomer section being arranged to be cooler over its whole length than the riser section, for example by unequal distribution of fuel elements between the two sections, so as to promote natural convection circulation of the heat transfer fluid and thereby dispense with forced circulation. The elimination of circulation pumps for this fluid reduces the number of moving mechanisms in the reactor.

More particularly, according to the present invention, the heat transfer fluid circuit has riser and downcomer sections of which only the riser section contains fuel elements, the downcomer section being exposed to conditions which effect cooling of the downcomer section relative to the riser section so that circulation by natural convection of the heat transfer fluid is promoted.

The downcomer section is conveniently cooled relative to the riser section by reactor coolant at inlet temperature.

The heat transfer fluid may be a neutron moderating liquid and the circuit for the heat transfer liquid is then placed in communication with a pressuriser by which the pressure of the heat transfer liquid is controllable, possibly to permit a slight degree of boiling in the heat transfer liquid so that turbulence is promoted in the liquid by the vapour bubbles generated therein.

The invention will be further described with reference to the two constructions embodying it which are illustrated by way of example in the accompanying drawings. In these drawings FIG. 1 shows the first construction, for the most part as a section on line 1—1 of FIG. 2, FIG. 2 is a plan view on the line 2—2 of FIG. 1, and FIG. 3 shows the second construction by means of a view corresponding to that of FIG. 1.

In the first construction of FIGS. 1 and 2, the illustrated nuclear reactor has a cylindrically shaped core in which assemblies of sheathed fuel elements are housed in lower portions of tubes 11 through which pressurised light water circulates as an intermediate heat transfer liquid, hereinafter referred to as the primary coolant. For further explanation of the disposition of the fuel elements the reader is referred to copending application 113,734. The tubes 11 are clustered in a core region defined by a cylindrical baffle 12, the whole assembly being housed in a reactor vessel 13. The reactor coolant, in the form of light water and hereinafter referred to as the secondary coolant, enters the reactor vessel through diametrically opposed inlets 14 and 15, circulates downwards through the annular space left between the innerwall of the reactor vessel and the baffle and upwardly through the core between the tubes 11. Neutron moderation in the reactor is effected by the primary and secondary coolants.

The reactor vessel is topped by a steam dome 16 from which projects a steam pipe 17. In its upward passage the secondary coolant is allowed to boil to form a mixture of steam and water which is separated downstream of the core by cyclone steam separators 18 disposed in the dome; these discharge steam through the steam pipe while unevaporated water passes out of the vessel to pumps for recirculation to the reactor through diametrically opposed outlets 19 of which the one appearing in FIG. 1 has been displaced through 90° in order to be visible. Steam from the reactor is employed as the working fluid in a turbine or delivered to a heat exchanger.

The tubes 11 are upright within the core and extend between lower and upper banks of headers. The tubes are arranged so that a group of them passing through one zone of the core, for example the central zone, extend in parallel between one lower header and one upper header whilst a group of fuel tubes passing through a second core zone, for example an annular zone surrounding the central core zone, extend in parallel between a second lower header and a second upper header; any convenient number of core zones may be employed, the zones being so chosen that all the fuel elements in one zone are at similar temperatures. In the present example four core zones are employed, that is to say, the central core zone and three annuli surrounding it.

For a fuller understanding of the core zoning, it is pointed out that, apart from the fringes, the core is composed of hexagonal cells each having a group of twelve tubes 11 arranged to form a hexagon bounding a vacancy for operation of a hollow cylindrical neutron absorber rod such as 20. These rods have open lower ends so as to be insertable into the core over fixed upstanding filler elements, such as 21, which are of sheathed graphite to counter peaking of the neutron flux in the vacancies. In the withdrawn position shown in FIG. 1, the rods are held above the fuelled portions of the tubes 11 by hydraulic mechanism which conveniently utilises appropriately pressurised secondary coolant as the hydraulic operating medium.

Each hexagonal tube cell has at the foot of the respective filler element 21 a header bulb 22 to which the lower ends of all the tubes in the cell are connected. At the top of each cell, the upper ends of the tubes are all interconnected in a ring and open into a header box 23 forming an extension of the absorber rod operating mechanism. The header bulbs 22 are connected according to zone with the four ring headers 24, 25, 26 and 27 constituting the lower header bank; thus the header bulbs, for example, of the seven hexagonal tube cells constituting the central core zone are connected to the lowermost ring header 24 (as illustrated, this header 24 has a diametral leg 28 for connection of the centre cell). The fringe tubes 11, which do not have the cell arrangement, are directly connected to the header 27. Similar connections are made between the header boxes 23 and the four ring headers 29, 30, 31 and 32 constituting the upper header bank.

Corresponding ring headers of the upper and lower banks are interconnected by pairs of unfuelled tubes 33 which pass through the annular space between the reactor vessel and the baffle and are therefore disposed in the inlet stream of secondary coolant. The independent interconnection of corresponding headers for each zone provides a single independent primary coolant circuit for each core zone, this circuit comprising a riser section constituted by a parallel group of tubes 11, an upper header, a downcomer section constituted by a parallel group of unfuelled tubes passing through the annular secondary coolant inlet space, and a lower header. The downcomer section of each circuit which is cooled by secondary coolant at inlet temperature is thus maintained at a lower temperature than the riser section of the circuit. Accordingly circulation of the primary coolant in these circuits is promoted by natural convection, thus obviating a need for primary circulation pumps.

Each primary circuit is in communication with a respective pressuriser through branch tubes, such as 34, from the downcomer tubes 33, there being a pressuriser for each core zone. Each pressuriser 35 is an upright cylinder disposed in the annular secondary coolant inlet space. The associated branch tubes 34 enter through the top of the cylinder and extend inside almost to the bottom. There is provided individually for each cylinder a gas pipe (not shown) which passes out of the reactor vessel to a gas charging system and includes valves so that a charge of a suitable gas, such as nitrogen or helium, can be trapped in the respective pressuriser cylinder at the requisite pressure. Relief valves 36 are provided respectively on one of each pair of the downcomer tubes 33.

By means of the pressurisers the pressure of the primary coolant in each circuit is adjusted relative to the maximum operating temperature of the riser section of the circuit so that a degree of boiling is permitted in the hottest parts of the riser section. The steam bubbles generated in this way promote turbulence in the primary coolant and thus increase heat transfer between the primary and secondary coolants. The permitted degree of boiling in the primary coolant is limited to avoid any risk of burnout of the fuel elements cooled by the primary coolant, burnout being a local overheating of a fuel element at a surface which is contacted by steam rather than water.

In the construction of reactor just described the primary coolant circuits comprise fuelled riser tubes and unfuelled downcomer tubes, these downcomer tubes being led outside the region of the core, though remaining within the reactor vessel, and being cooled by secondary coolant at inlet temperature. It is to be understood, however, that the invention may be embodied in reactors having primary coolant circuits comprising riser tubes and downcomer tubes both of which contain fuel. In this case the downcomer tubes could be maintained cooler than the riser sections by providing less nuclear fuel in the downcomer tubes than in the riser sections.

In the second construction of FIG. 3, a circuit for primary coolant has fuelled riser and downcomer sections, a temperature differential between the two sections being maintained by cooling the downcomer sections by boiling secondary coolant and cooling the riser sections by superheated secondary coolant vapour. The core contains sheathed fuel elements housed in tubes 11 as in the previous construction and through these tubes a pressurised primary coolant circulates as the intermediate heat transfer liquid. It is preferred in this case to use a pressurised organic liquid as primary coolant on account of its low vapour pressure which allows the primary coolant to be taken to the order of temperature necessary for superheating steam without raising the pressure of the primary coolant so high as to render its containment difficult. It will be understood that other liquids could be used as the primary coolant, even pressurised water, provided the fuel and extension tubes could be made strong enough to withstand the pressures involved. The core region defined by the cylindrical baffle 12 within the reactor vessel 13 is divided by a second concentric cylindrical baffle 40 into an outer annular boiling zone and an inner superheat zone. The reactor coolant in the form of light water, enters the reactor vessel through the inlets 15, circulates downwards through the annular space between the reactor vessel 13 and the outer baffle 12 and upwardly through the boiling zone of the core between the tubes 11 in this zone. In its upward passage through this zone the secondary coolant is allowed to boil to form a mixture of steam and water which is separated by the cyclone steam separators 19 in the steam dome 16 above the core; these separators are clustered around an upper closed end of the inner baffle 40 into which they discharge separated steam for passage downwards through the inner superheat zone of the reactor core. The superheated steam is discharged from the reactor vessel through a steam pipe 41. Neutron moderation in the reactor is effected by the primary and secondary coolants.

The tubes 11 passing through the superheat zone of the core extend between upper and lower central ring headers 42 and 43 situated above and below the inner superheat zone adjacent the closed ends of the inner baffle 40, whilst tubes 11 passing through the boiling zone of the core extend between upper and lower ring headers 44 and 45 situated above and below the boiling zone around the inner baffle. Radial tubes such as 46 passing through the inner concentric baffle interconnect the outer ring headers with their respective central ring headers. In this way there is provided a circuit for primary coolant comprising a riser section constituted by the tubes passing through the inner superheat zone, the two interconnected upper headers 42 and 44, a downcomer section constituted by the fuel tubes passing through the outer annular boiling zone, and the two interconnected lower headers 43 and 45. The downcomer section, being cooled by boiling secondary coolant water, is maintained cooler than the riser section which is cooled by superheated steam. Accordingly circulation of the primary coolant in the circuit by natural convection is promoted.

Pressurisation of the primary coolant is uniform in this case and for this purpose a single pressuriser is composed of a series of interconnected toroidal ducts 47 superposed one above the other in the annular secondary coolant inlet space. A branch pipe 48 from the outer upper ring header 44 penetrates to the lowermost toroidal duct through aligned interconnections. The pressure of gas trapped in this pressuriser over the primary coolant free surface is determined by the requirement to prevent any more than a slight degree of boiling at the hottest parts of the primary coolant circuit which will of course be in the superheat zone.

The reactor having a superheat zone just described has the advantage that the central zone of the core which is being used to superheat the stream is almost inevitably the hottest zone of any reactor core. Furthermore heat transfer between the primary and secondary coolants in this reactor takes place between coolants flowing in opposite directions; thus the primary coolant flowing upwardly in the riser section is cooled by downwardly flowing steam, whilst the primary coolant flowing downwardly in the downcomer section is cooled by upwardly flowing boiling secondary coolant. Although the superheat zone of the core is undermoderated with respect to the boiling zone of the core owing to absence of liquid secondary coolant in the superheat zone, a certain fixed degree of moderation throughout the core is provided by the primary coolant in the fuel tubes and may be enhanced by increasing the volume ratio of primary coolant to fuel in the superheat zone relative to the boiling zone.

What I claim is:

1. In a nuclear reactor having a reactor vessel, the combination in said vessel comprising upstanding tube means clustered in spaced relationship and exposed externally to a reactor coolant, fuel elements contained together with a heat transfer fluid in said tube means and grouped thereby into a reactive core configuration, and interconnecting means by which said tube means are made into at least one closed convection circulation circuit having a riser section and a downcomer section for flow of the heat transfer fluid upwards in the former section and downwards in the latter section by the action of natural convection.

2. In a nuclear reactor, the combination comprising upstanding tube means clustered in spaced relationship and exposed externally to a reactor coolant, fuel elements contained together with a heat transfer fluid in said tube means and grouped thereby into a reactive core configuration, top and bottom header means into which respective ends of said tube means open, and unfuelled interconnecting tube means joining said top and bottom header means for establishing natural convection flow of the heat transfer fluid without forced circulation.

3. A nuclear reactor for evaporating a liquid reactor coolant and comprising a reactor vessel, a first upright baffle disposed within the vessel and bounding therein a first space, a second upright baffle extending around the first baffle to define a second space between the two baffles and a third space between the second baffle and an inner wall of the reactor vessel, an inlet for reactor coolant opening into said third space, means giving intercommunication between asid second and third spaces adjacent one end of said second baffle, vapour separator means adjacent the other end of said second baffle to pass vaporised coolant from said second to said first space, an outlet for vaporised coolant leading from said first space to the exterior of the reactor vessel, tube means spaced in upright relationship some in said first space and the remainder in said second space, interconnecting means joining top and bottom ends of the tube means in the first space respectively with top and bottom ends of the tube means in the second space, fuel elements in a reactive core configuration confined entirely together with a heat transfer fluid in the tube means in both said first and second spaces.

4. A nuclear reactor as set forth in claim 3 and further comprising in communication with the tube means a pressuriser for pressurising against substantial boiling a neutron-moderating liquid used as the heat transfer fluid.

5. In a nuclear reactor, the combination comprising upstanding tube means clustered in spaced relationship and exposed externally to a reactor coolant, fuel elements contained in company with a neutron-moderating liquid in said tube means and grouped thereby into a reactive core configuration, interconnection means joining said tube means in groups to form a number of independent closed circuits for circulation of the neutron-moderating liquid, and pressurisers respectively in communication with said closed circuits to enable pressurisation of the circuits to different degrees.

6. In a nuclear reactor, the combination comprising upstanding tube means clustered in spaced relationship and exposed externally to a reactor coolant, fuel elements contained in company with a neutron-moderating liquid in said tube means and grouped thereby into a reactive core configuration, a plurality of chambers having trapped therein volumes of gas respectively at different degrees of pressurisation, and means intercommunicating each tube means with a selected chamber for imparting the respective degree of pressurisation to the liquid in the tube means.

7. In a nuclear reactor, the combination comprising upstanding tube means clustered in spaced relationship and exposed externally to a reactor coolant, fuel elements contained in company with a neutron-moderating liquid in said tube means and grouped thereby into a reactive core configuration, interconnecting means grouping into independent closed circuits a first group of said tube means constituting a central region of the cluster and at least one other group of said tube means constituting a band around said central region, and pressurisers repectively in communication with said closed circuits to enable pressurisation of the circuits, and hence of the liquid therein, to different degrees.

8. A nuclear reactor for evaporating a water coolant and comprising a reactor vessel, an upright baffle disposed within the vessel to separate a first space encompassed thereby from a second surrounding space, first tube means clustered within said first space in upright parallel relationship, top and bottom header means into which respective ends of said first tube means open, second tube means etxending in said second space to join together said top and bottom headers so as to form at least one closed circuit, water contained flowably in said circuit, fuel elements also contained in said circuit and located within lower lengths of said first tube means with said water present as a surrounding layer, pressurising means within the vessel in communication with said circuit for pressurising said water against substantial boiling, an inlet through the reactor vessel adjacent an upper end of said baffle for the admission of coolant to said second space, and an outlet for steam leading from the top of the baffle to the exterior of the reactor vessel, the lower end of the baffle being open to give intercommunication of the first and second spaces, whereby the inlet coolant passes downwardly over the second tube means in the second space and then upwardly for evaporation over the first tube means in the first space.

9. A nuclear reactor as set forth in claim 8 comprising a plurality of said circuits and a corresponding number of pressurisers disposed within said second space and respectively in communication with said circuits to enable pressurisation thereof to different degrees.

10. A nuclear reactor as set forth in claim 8 comprising a steam separator disposed in the path of the coolant between said outlet and tops of said first tube means.

11. A nuclear reactor for evaporating and superheating a water coolant comprising a reactor vessel, a first upright baffle disposed within the vessel and bounding therein a superheating zone, a second upright baffle extending around the first baffle to define a boiling zone between the two baffles and an inlet zone between the second baffle and an inner wall of the reactor vessel, an inlet for the water coolant opening into the inlet zone, means giving intercommunication between the inlet and boiling zones adjacent the bottom of the second baffle, a steam separator adjacent the top of the second baffle to pass steam from the boiling zone into the superheating zone, an outlet for superheated steam leading from the bottom of the first baffle to the exterior of the reactor vessel, first tube means clustered within the superheating zone in upright parallel relationship, top and bottom header means into which respective ends of said first tube means open, second tube means clustered within the boiling zone in upright parallel relationship and joining together the top and bottom header means to form at least one closed circuit having a riser section in the superheating zone and a downcomer section in the boiling zone, a neutron-moderating liquid contained flowably in said circuit, fuel elements also contained within said circuit and located within lower lengths of both the first and second tube means with said liquid present as a surrounding layer, and pressurising means within the reactor in communication with said circuit for pressurising said liquid against substantial boiling.

References Cited by the Examiner

UNITED STATES PATENTS 3,034,977    5/1962    Hall et al. _____ 176—54

FOREIGN PATENTS 864,379    4/1961    Great Britain.
868,627    5/1961    Great Britain.

OTHER REFERENCES

Maier-Leibnitz: German application No. 1,064,652, printed Sept. 3, 1959.

LEON D. ROSDOL, *Primary Examiner.*

REUBEN EPSTEIN, CARL D. QUARFORTH,
*Examiners.*

L. D. RUTLEDGE, *Assistant Examiner.*